United States Patent
Narahara

[19]
[11] Patent Number: 6,023,527
[45] Date of Patent: *Feb. 8, 2000

[54] METHOD AND SYSTEM OF SELECTING A COLOR SPACE MAPPING TECHNIQUE FOR AN OUTPUT COLOR SPACE

[75] Inventor: Kouichi Narahara, Yokohama, Japan

[73] Assignee: Ricoh Company, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/670,161

[22] Filed: Jun. 27, 1996

[30] Foreign Application Priority Data

Jun. 27, 1995 [JP] Japan ................................. 7-160683
Jun. 12, 1996 [JP] Japan ................................. 8-151054

[51] Int. Cl.⁷ ..................................................... H04N 1/60
[52] U.S. Cl. ........................... 382/167; 358/518; 358/520
[58] Field of Search .................................. 358/518, 520, 358/522, 523; 382/167; 395/125, 127, 131, 114, 109; 345/427, 431; H04N 1/60

[56] References Cited

U.S. PATENT DOCUMENTS

| | | | |
|---|---|---|---|
| 3,144,510 | 8/1964 | Farber et al. ............................. | 178/5.2 |
| 4,500,919 | 2/1985 | Schreiber .................................. | 358/78 |
| 5,319,473 | 6/1994 | Harrington ............................... | 358/522 |
| 5,463,480 | 10/1995 | MacDonald et al. .................... | 358/520 |
| 5,539,540 | 7/1996 | Spaulding et al. ....................... | 358/520 |
| 5,596,428 | 1/1997 | Tytgat et al. ............................. | 358/518 |
| 5,712,925 | 1/1998 | Ohga ........................................ | 358/518 |

FOREIGN PATENT DOCUMENTS 4-119765  4/1992  Japan .

OTHER PUBLICATIONS

Gamut Mapping for Color Simulation on CRT devices Marcu et al., Proceedings of the SPIE, vol. 2658, p. 308–15.

Principles of digital image sythesis by glassner, pp. 63–66, 1995.

The LCH coordinates are based upon Luminance (L) Chroma (C) and Hue (H), pp. 585–587, Foley et al, 1995.

*Primary Examiner*—Kim Yen Vu
*Attorney, Agent, or Firm*—Knoble & Yoshida LLC

[57] ABSTRACT

In order to achieve consistently accurate results in gamut mapping, a first device gamut is systematically mapped into a second device gamut by using a predetermined set of mapping techniques, and based upon a predetermined index of the generated output color quality, the best mapping technique is selected. In the alternative, the best mapping technique is subjectively selected by an operator.

51 Claims, 12 Drawing Sheets

METHOD AND SYSTEM OF SELECTING A COLOR SPACE MAPPING TECHNIQUE FOR AN OUTPUT COLOR SPACE

FIELD OF THE INVENTION

The current invention is generally related to a method and a system of converting a color space of a given image into another color space of an output device for outputting the image with least color distortion, and more particularly related to a method and a system of selecting the most appropriate gamut mapping technique from a predetermined set of gamut mapping techniques based upon the comparison of a certain quality of the output images generated by the gamut mapping techniques.

BACKGROUND OF THE INVENTION

In general, input and output devices such as scanners, printers and display monitors respectively have a different range of color capabilities. A particular color is usually defined in a three dimensional color space which includes the tristimulus RGB coordinates and the Lab coordinates. The definitions of these coordinates in pages 585–587 of Computer Graphics by Foley et al. (1995) pages 63–66 of Principles of Digital Image Synthesis by Glassner (1995) are incorporated herein by external reference and are not reiterated here. The LCH coordinates are based upon Luminance (L), chroma (C) and hue (H). A range of colors that a device is capable of processing in a certain color space is known as a gamut. As shown in the Lab color space in FIG. 1, a gamut of a printer is generally smaller than that of a color display monitor or a cathode ray tube (CRT). Because of the difference in the gamut or color space between the devices, when an image defined for one device such as a display monitor is outputted into another device such as a printer, the colors of the printed image fail to exactly match those of the displayed image.

To further illustrate a gamut difference, FIG. 2 shows a cross section of a three dimensionally represented gamut near "red" for a color CRT and an ink jet printer. The inner dotted lines represent a boundary of the color range for the inkjet printer while the outer solid lines represent a boundary for the color CRT and include the inkjet printer gamut. In the Y axis, luminance L is plotted between a point representing white and another point representing black. In the X axis, purity or croma C is plotted for these two devices. Each line indicates an outside boundary of a gamut. Since the gamut of the inkjet is smaller than that of the color CRT, certain CRT colors shown in the area between the two gamut boundaries are not printed by the inkjet printer. In order to accommodate the different gamut sizes, gamut mapping has been considered.

Gamut mapping or color space correction is a technique to fit one gamut of a first size to another gamut of a second size. If a large gamut is mapped into a small gamut size, the mapping process is known as a gamut compression. On the other hand, a small gamut is mapped into a large gamut, the mapping process in known as a gamut expansion. In general, the gamut mapping techniques are classified as either local and global. In a local mapping technique, only colors outside of the smaller gamut is adjusted. In contrast, in a global mapping technique, all colors in the gamut are adjusted. Although the global mapping technique generally shifts all of the colors in the gamut at an equal rate, a hybrid approach between the global and local mapping techniques adjusts certain selected portions of the color space at an equal rate.

In addition to the above described general categories of the mapping techniques, the color correction process involves the independent adjustments of dominant wavelength, luminance and purity. During the mapping process, one or more of the above characteristics is controlled at a constant level so that the mapped colors are finely adjusted.

Furthermore, Japanese Laid Patent Publication 4-119765 discloses a color digital copier system for adjusting a gamut compression technique based upon an input pattern. To adjust the compression, an input image is scanned to generate a color distribution pattern, and the pattern is stored. During the pixel-by-pixel gamut compression of the same image, the compression ratio for a particular pixel color value is adjusted according to the previously stored color distribution pattern. In addition to the adjustment of the mapping ratio, the system also selects a mapping technique based upon the input pattern. Similarly, U.S. Pat. No. 3,133,510 issued to Farber also discloses independent adjustments of purity and luminance depending upon an input image. The above described prior attempts focus upon the input image characteristics to adjust a gamut mapping technique.

Another prior approach in color adjustment is disclosed in U.S. Pat. No. 4,500,919 issued to Schreiber. The Schreiber patent is directed to computer assisted color matching for printing a color image to match original colors. An operator of the system is allowed to modify the colors on a display before actually printing on an image-carrying medium such as paper. After the operator finishes the matching process, the system determines an appropriate amount of toner or ink for printing based upon the previously stored printing ink data. In this system, the color editing is based upon the operator's perception rather than the above described automatic gamut compression technique using the input image characteristic data. Although the Schreiber patent discloses the color adjustments based upon the operator's perception of the output colors, the adjustments are manual and not automatic.

The problems of the above described prior attempts include that the output color image is not used in selecting he most appropriate mapping technique. In Japanese Laid Patent Publication 4-119765 and U.S. Pat. No. 3,133,510, the mapping is adjusted based upon the input color distribution, and no evaluation is made on the outputted colors. Although the Schreiber patent focuses upon the output colors, the adjustment is made manually by an operator. In order to achieve consistently accurate results in gamut mapping, output colors should be mapped in a systematic fashion and the generated output colors should be evaluated in an objective fashion with respect to original input colors.

SUMMARY OF THE INVENTION

To solve the above and other problems, according to a first aspect of the current invention, a method of color space mapping, includes the steps of: a) storing a plurality of predetermined mapping techniques for converting an image in a first color space into a second color space of a desired output device; b) generating at least a part of an output image in the second color space using each of the mapping techniques; and c) selecting one of the mapping techniques best suited for the image using the output device based upon a comparison of the output images generated in the step b).

According to a second aspect of the current invention, a method of adaptably mapping one color space to another, includes the steps of: a) selecting a plurality of mapping techniques for converting an image originally generated in a first color space into a second color space of a desired output device; b) generating a part of an output image in the second color space using each of the selected mapping techniques; c) extracting a predetermined characteristic value of each output image generated in the step b), the predetermined characteristic value indicating how closely colors match between the input image and the output image; d) comparing the predetermined characteristic values among the output images; e) selecting one of the mapping techniques based upon a predetermined characteristic; and f) generating an entire output image using the selected mapping technique for the output device.

According to a third aspect of the current invention, a system for color space mapping, includes: a correction support unit for storing a plurality of predetermined mapping techniques for converting an image in a first color space into a second color space of a desired output device; a reproduction trial unit connected to the correction support unit for generating at least a part of an output image in the second color space for each of the mapping techniques; and a correction evaluation unit connected to the reproduction trial unit for selecting one of the mapping techniques best suited for the image using the output device based upon a comparison of the output images.

According to a fourth aspect of the current invention, a system for adaptably mapping one color space to another, includes: a mapping technique selection unit for selecting a plurality of mapping techniques for converting an image originally generated in a first color space into a second color space of a desired output device; a preprocessing unit connected to the mapping technique selection unit for generating a part of an output image in the second color space using each of the selected mapping techniques; an output image characteristics extracting unit connected to the preprocessing unit for extracting a predetermined characteristic value of each output image generated, the predetermined characteristic value indicating how closely colors match between the input image and the output image; a comparison unit connected to the output image characteristics extraction unit for comparing the predetermined characteristic values among the output images; an selection unit connected to the comparison unit for selecting one of the mapping techniques based upon a predetermined characteristic; and a main processing unit connected to the selection unit and the mapping technique selection unit for generating an entire output image using the selected mapping technique for the output device.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
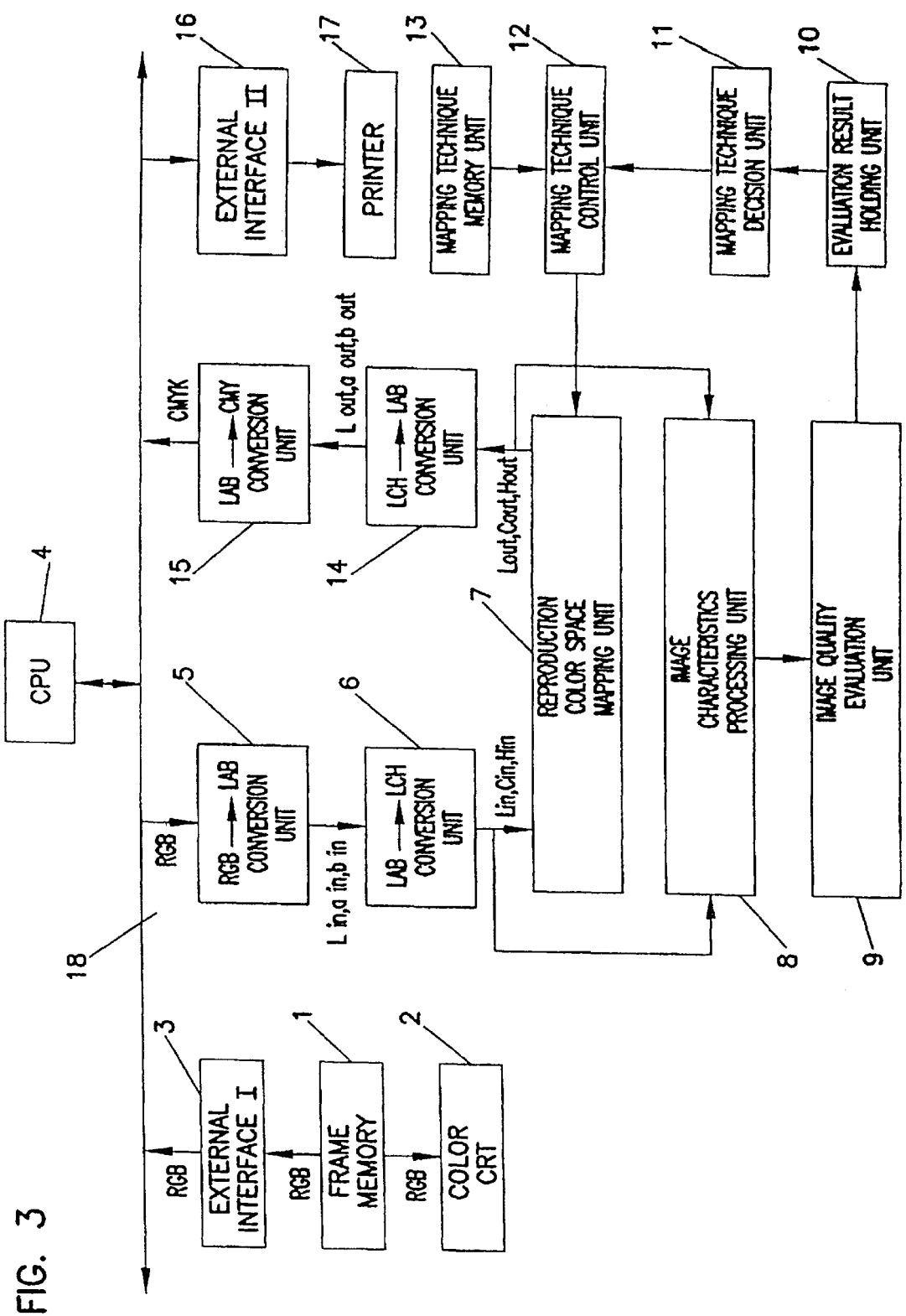
FIG. 3 is a block diagram illustrating one embodiment of the system for selecting a color space mapping technique based upon the output image quality according to the current invention.

Referring now to the drawings, wherein like reference numerals designate corresponding structure throughout the views, and referring in particular to FIG. 3, one preferred embodiment of the system according to the current invention selects a color space mapping technique based upon the output image quality. A CPU 4 is connected to devices such as a color CRT monitor 2 and a printer 17 via a bus 18. In this embodiment, the CRT monitor 2 is considered as an input device while the printer 17 as an output device for the purpose of a gamut mapping process. In other words, the system performs the gamut mapping process where a range of the colors that the CRT monitor 2 is capable of displaying is compressed into a smaller range of colors that the printer 17 is capable of printing. In order to map the gamuts, the color correction or color mapping units 7–13 determine the best mapping technique by comparing the actual output images generated by a plurality of predetermined mapping techniques. The best mapping technique is stored, and the subsequent mapping processes are performed based upon the best mapping technique.

Still referring to FIG. 3, the color display monitor 2 provides an input color signal via a frame memory 1. The frame memory stores digital color signals for each pixel on the monitor 2. Each of the color signals is generally a combination of a R signal indicative of a red value, a G signal indicative of a green value and a B signal indicative of a blue value. The RGB signal is first processed by a RGB to Lab conversion unit 5 via a first external interface unit 3 and the bus 18 and then by a Lab to LCH conversion unit 6. As a result, a RGB signal is converted to a LCH signal as referenced as $L_{in}$, $C_{in}$ and $H_{in}$ before processed by the color correction units 7–13.

In the color correction units 7–13, the above converted LCH signal is further processed to determine the best gamut mapping technique. A reproduction color space mapping unit 7 receives the converted LCH signal as well as a command signal indicative of a particular mapping technique specified by a mapping technique control unit 12. A plurality of predetermined mapping techniques is stored in a mapping technique memory unit 13, and the mapping technique control unit 12 retrieves the particular mapping technique at a given time. An additional command signal is also defined to specify a certain set of the predetermined mapping techniques so that not every mapping technique stored in the mapping technique storage unit 13 is used. Examples of the predetermined mapping techniques will be later discussed with respect to FIGS. 7–11. Thus, the reproduction color space correction unit 7 generates the mapped signal.

The above mapped signal is evaluated by an image characteristics processing unit 8. In general, the image characteristics processing unit 8 compares the input signal and the mapped output signal and extracts a predetermined characteristics or value. The image characteristics processing unit 8 generates a characteristic signal and sends it to a mapping evaluation unit 9 for evaluating how well the particular technique has mapped a specified color in one color space into another color space. The mapping evaluation unit 9 generates a signal indicative of the evaluation and sends the evaluation signal to an evaluation result holding unit 10. The evaluation signal is accumulated for every mapping technique and is held in the evaluation result holding unit 10. The accumulated evaluation signals are then sent to a mapping technique decision unit 11 for selecting the best suited or most desirable mapping technique among the predetermined mapping techniques. The most desirable technique is noted, and the information regarding the most desirable technique is stored in the mapping technique storing unit 13.

Based upon the above determined most desirable mapping technique, a subsequent input image is mapped, and the mapped signals $L_{out}$, $C_{out}$ and $H_{out}$ is now ultimately converted to a CMYK signal for a printer. This conversion is performed by a LCH to LAB conversion unit 14 and a LAB to CMY conversion unit 15. The CMYK signal includes a C value for specifying an amount of cyan toner, a M value for specifying an amount of magenta toner, a Y value for specifying an amount of yellow toner and a K value for specifying an amount of black toner. The CMYK signal is sent to the printer on the bus 18 via a second external interface unit 16.

Figure 4:
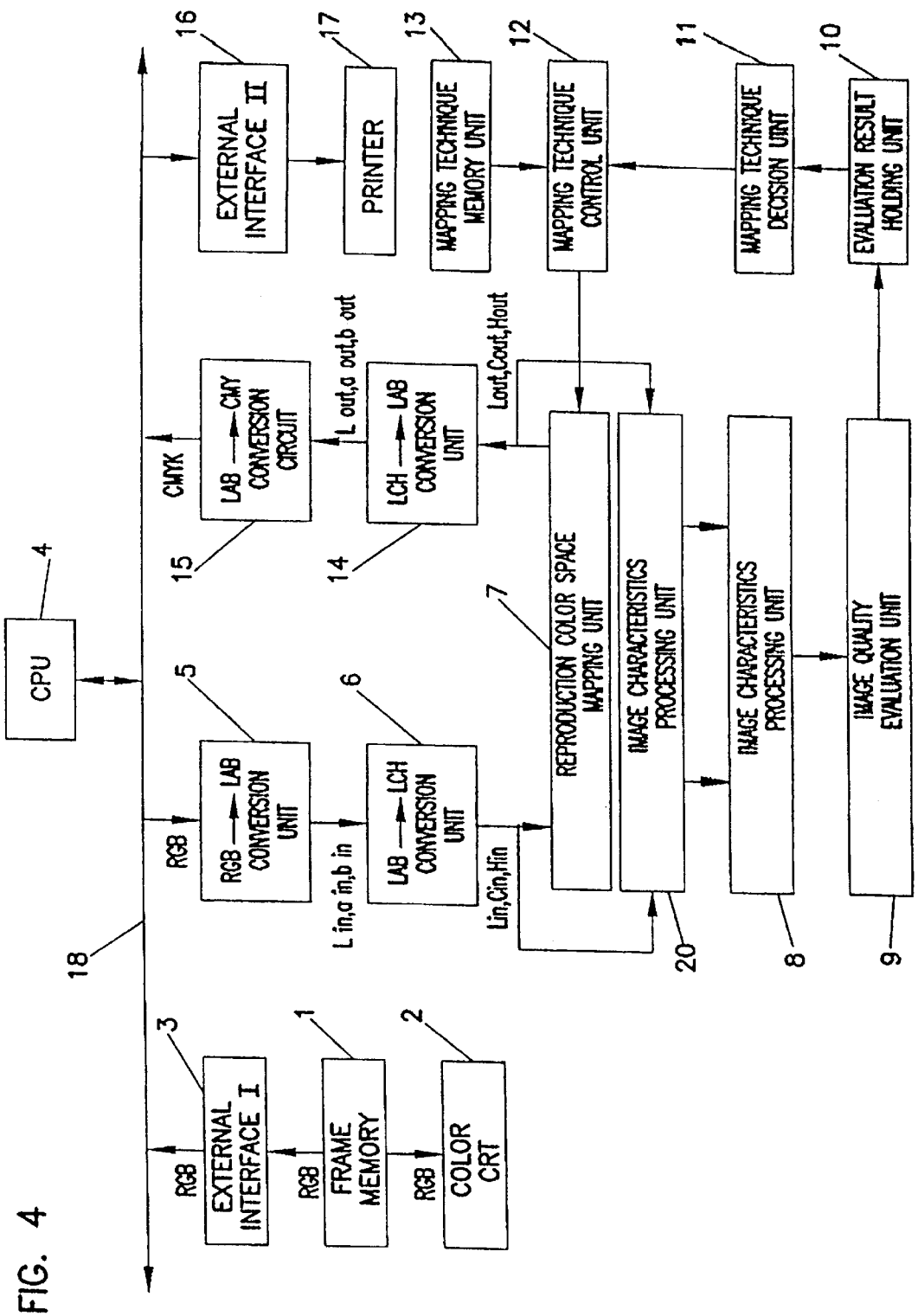
FIG. 4 is a block diagram illustrating a second embodiment of the system for selecting a color space mapping technique based upon the output image quality of sampled areas according to the current invention.

Now referring to FIG. 4, a block diagram illustrates a second preferred embodiment of the system according to the current invention. The second embodiments includes substantially the same components as the first embodiment except for an sample area selection unit 20. In general, the sample area selection unit 20 is located near the color space correction circuits 7–13. According to one implementation, the sample area selection unit 20 selects a portion of the image for the above described further analysis of the mapped information. In other words, the reproduction color space mapping unit 7 first maps the color data for an entire image, and then the sample area selection unit 20 selects a certain portion based upon a predetermined selection criterion. For the comparison/evaluation purposes, the sample area selection unit 20 also selects the corresponding input color data before the mapping process performed by the reproduction color space mapping unit 7. These sampled input and output data is sent to the image characteristics processing unit 8.

Another use of the sample area selection unit 20 is to select an area before the mapping process, and only the selected area is sent to the reproduction color space mapping unit 7. In other words, for the sake of faster processing, only a portion is mapped for each mapping technique, and the comparison and evaluation of the mapping technique is performed on the selected portion. For the above described use of the sample area selection unit 20, the unit 20 is alternatively place at a location designated by a reference numeral 20*.

Still referring to FIG. 4, one preferred embodiment of the above described sample area selection unit 20 includes a programmable unit capable of specifying a certain characteristics, a command and/or a criterion for selecting a sample area. For example, an operator specifies a user mode for specifying a user-defined area or an automatic mode for selecting a sample area based upon a certain specified criterion. Such automatic selection criteria include an out-of-gamut selection command for selecting an area containing colors that are not within a specified gamut. Other commands for specifying certain conditions include a high luminance condition for selecting an area whose luminance value is higher than a predetermined luminance value, a high croma condition for selecting an area whose croma value is higher than a predetermined croma value, and a hue condition for selecting an area whose hue value is within a certain range. Examples of the hue condition for the RGB color system specify whether an input hue signal $H_{in}$ value is within a range of $H_{red}$–offset and $H_{red}$+offset, a range of $H_{blue}$–offset and $H_{blue}$+offset or $H_{green}$–offset and $H_{green}$+offset where offset is a predetermined value. $H_{red}$, $H_{green}$ and $H_{blue}$ are respectively the hue of the R, G and B components in the HCL color space. The above described selection criteria for selecting an area are merely exemplary and are not limited in practicing the current invention.

Figure 5:
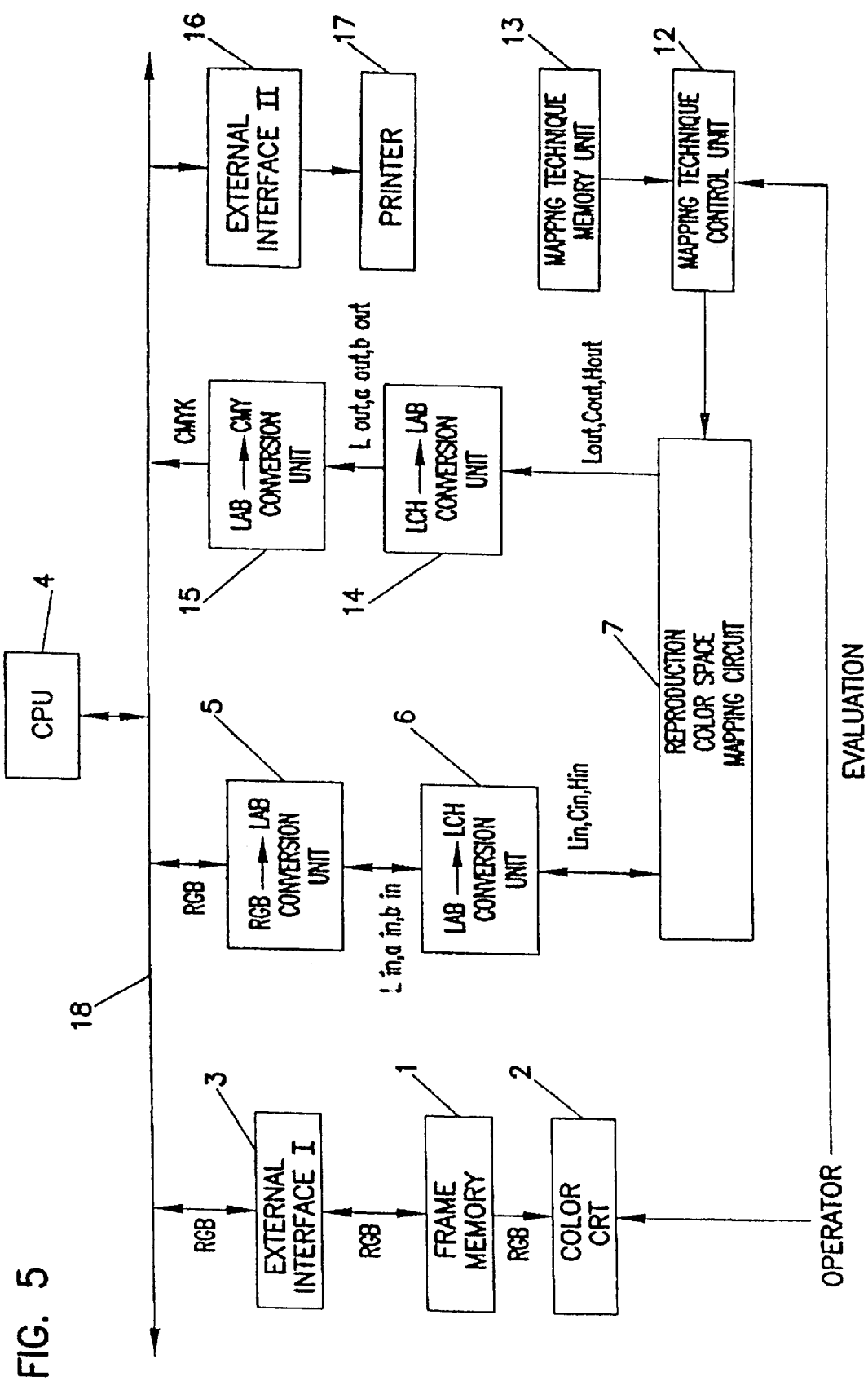
FIG. 5 is a block diagram illustrating a third embodiment of the system for selecting a color space mapping technique based upon the operator's perception of the output image quality according to the current invention.

Now referring to FIG. 5, a third embodiment of the system according to the current invention is also similar to the above described embodiments except that the third embodiment lacks the evaluation units and involves an operator evaluation. In this embodiment, after a reproduction color space mapping unit 7 maps an input color data according to a predetermined mapping technique, the mapped color data is converted back to the RGB signal by a reverse process in a LCH to LAB conversion unit 6 and a RGB to LAB conversion unit 5. The converted and mapped RGB signal is displayed right next to the original input color on the color CRT monitor 2. The operator observes a color display monitor so as to compare the displayed representations of the mapped colors with those of the corresponding original colors for each mapping technique. The operator subjectively determines the best mapping technique based upon the above comparisons and specifies the best technique via a mapping technique control unit 12. Although the third embodiment does not include the sample area selection unit as described with respect to FIG. 4, the third embodiment as shown in FIG. 5 is adaptable to combine other units such as the sample area selection unit for practicing the current invention.

Figure 6:
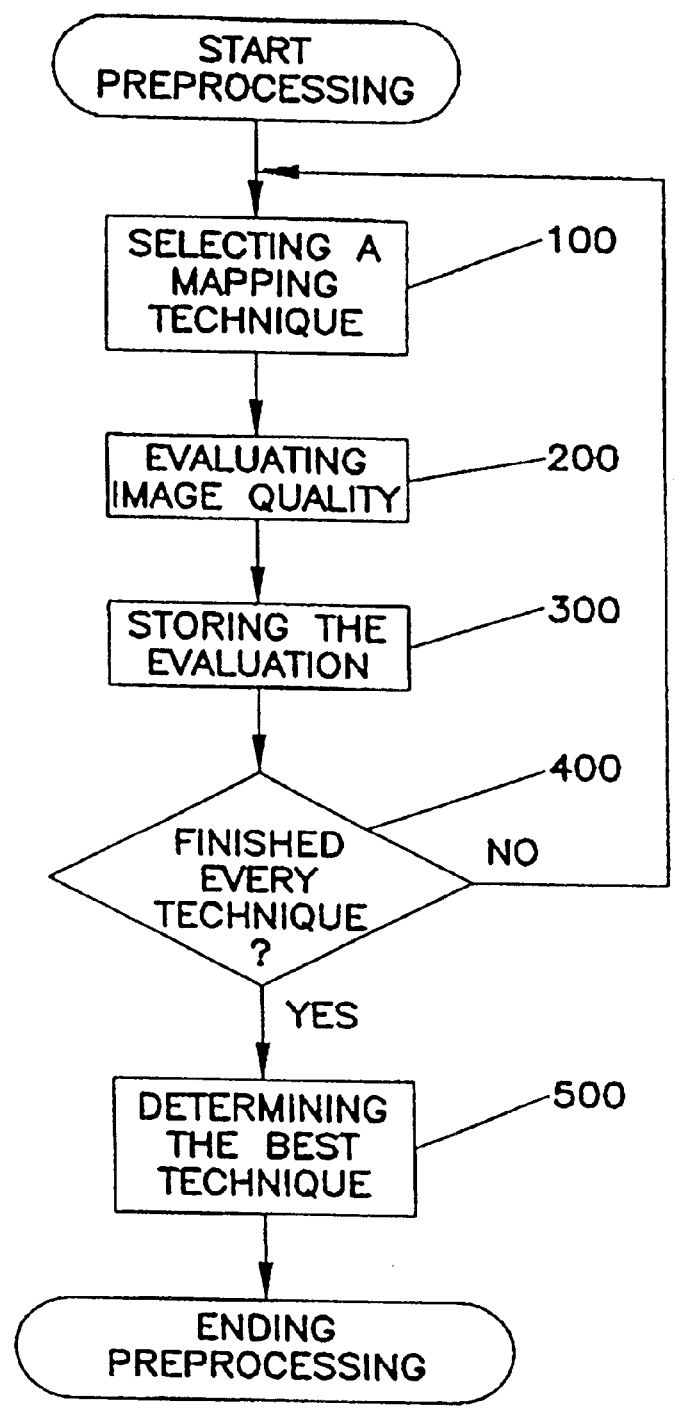
FIG. 6 is a flow chart illustrating a pre-process of selecting the best mapping technique based upon the output image quality according to the current invention.

Referring to FIG. 6, a preferred process of selecting a desirable mapping technique generally involves steps of trying every one of predetermined mapping techniques and determining which one is the best mapping technique. In a step 100, a mapping technique to be used is selected for each trial, and after the data is mapped based upon the current mapping technique, the mapped value is evaluated in an evaluation image quality step 200. The evaluation value is then stored for a later comparison in a step 300. The trial is repeated until every one of the predetermined mapping techniques is attempted, and the completion is checked in a step 400. If there remain unattempted predetermined mapping techniques, the mapping technique application step 100 is repeated. On the other hand, every mapping technique has been attempted, a selection process 500 is performed to select the best or the most desirable mapping technique in a step 500. The above described steps are generally considered as a preprocessing steps for the entire mapping process.

Figure 1:
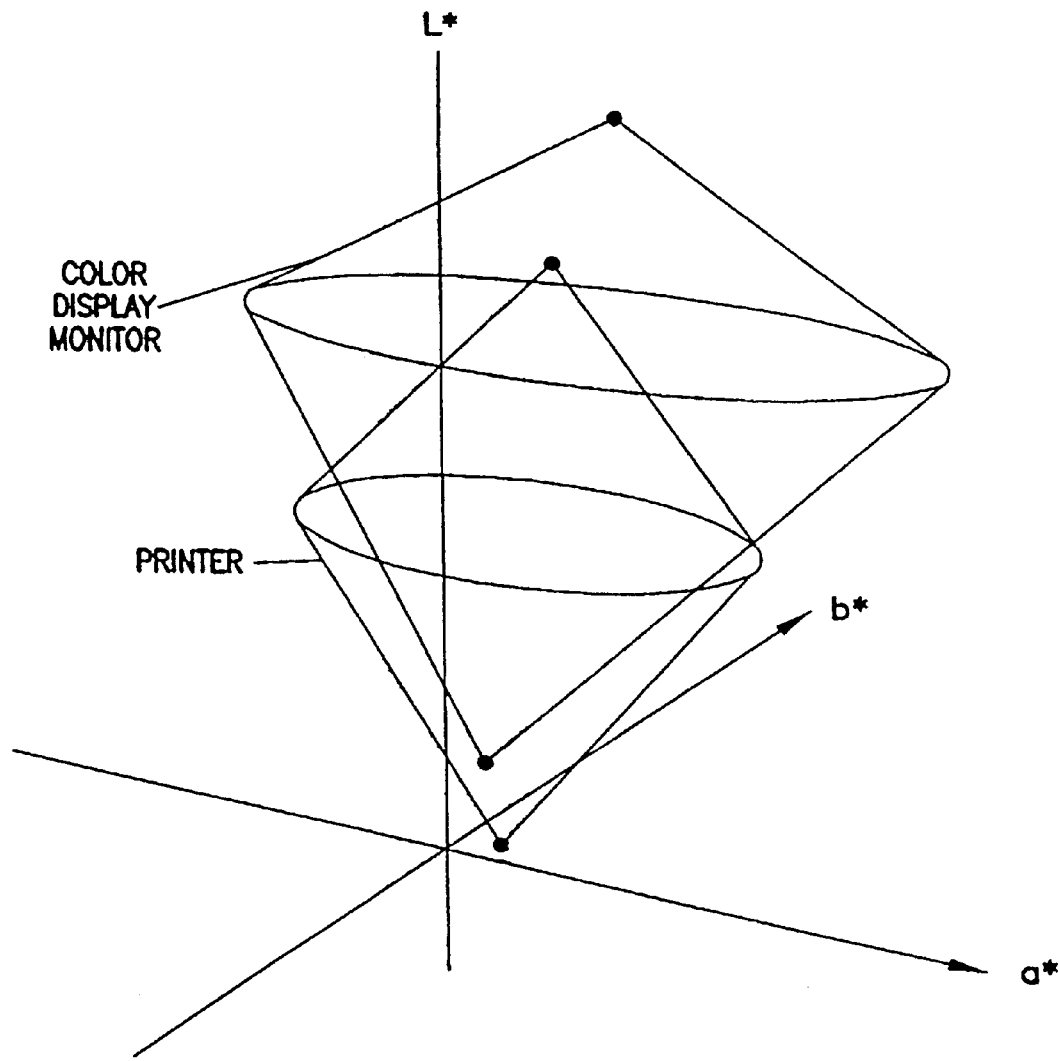
FIG. 1 is a three dimensional color space or a gamut of a color display monitor and a printer in the Lab color space.
Figure 7:
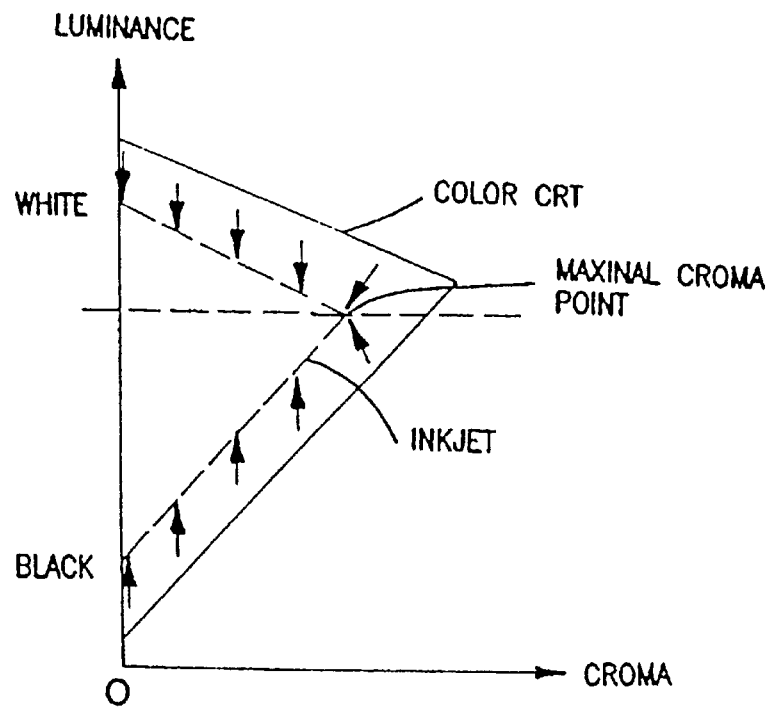
FIG. 7 illustrates a color compression process of a two dimensionally represented gamut of a color CRT onto that of an inkjet printer while purity or croma is maintained at substantially the same level.
Figure 2:
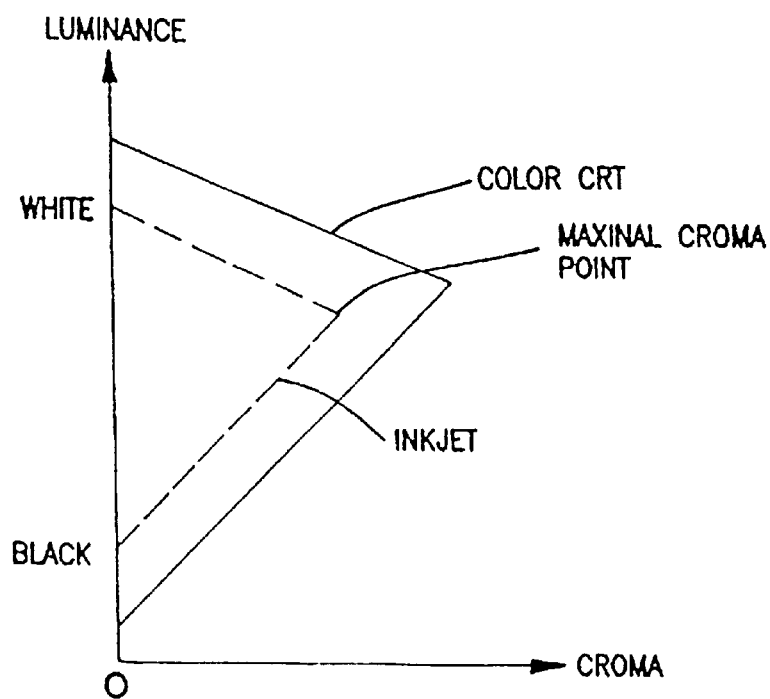
FIG. 2 is a two dimensional color space near red of an inkjet printer and a color CRT.

In the above described mapping technique application step 100 of FIG. 6, a set of predetermined mapping techniques is used, and these mapping techniques include the following exemplary techniques as will be described in reference to FIGS. 7–11 as well as other variations. Referring to FIG. 7, one of the predetermined mapping techniques for mapping the gamut of a color display monitor onto the gamut of an inkjet printer is illustrated. This compression technique involves that the purity or croma component of the color display gamut is substantially maintained while the luminance of the color display is adjusted. In other words, the direction of adjustments is substantially parallel to the Y axis except for near the maximal purity point. In particular, in a region above the line parallel to the x axis and going through the maximal point, the direction of the adjustments is parallel to the Y axis and downwardly towards the black value. In a region below the line parallel to the X axis and going through the maximal point, the direction of the adjustments is parallel to the Y axis and upwardly towards the white value. The direction of the adjustments near the maximal purity point is not necessarily parallel to the Y axis but towards the maximal purity point.

Figure 8:
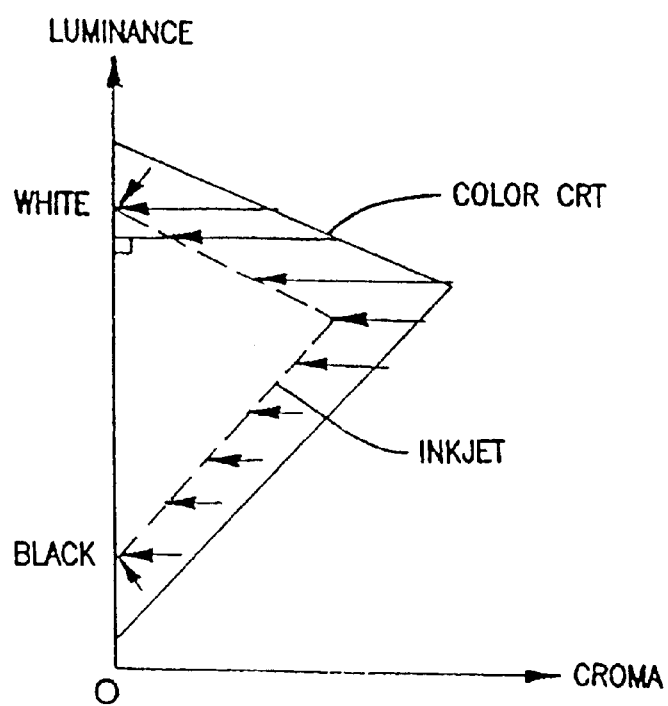
FIG. 8 illustrates a color compression process of a two dimensionally represented gamut of a color CRT onto that of an inkjet printer while luminance maintained at substantially the same level.

In contrast, referring to FIG. 8, the luminance of the color display is substantially maintained during the mapping process while the purity or croma of the color display unit is adjusted to map onto the gamut of the inkjet printer. In other words, the direction of adjustments is substantially parallel to the X axis except for a region near the white and black points on the Y axis. Near the white point, the direction of the adjustment is downwardly and perpendicular to the inkjet gamut boundary while near the black point, the direction of the adjustment is upwardly and perpendicular to the boundary.

Figure 9:
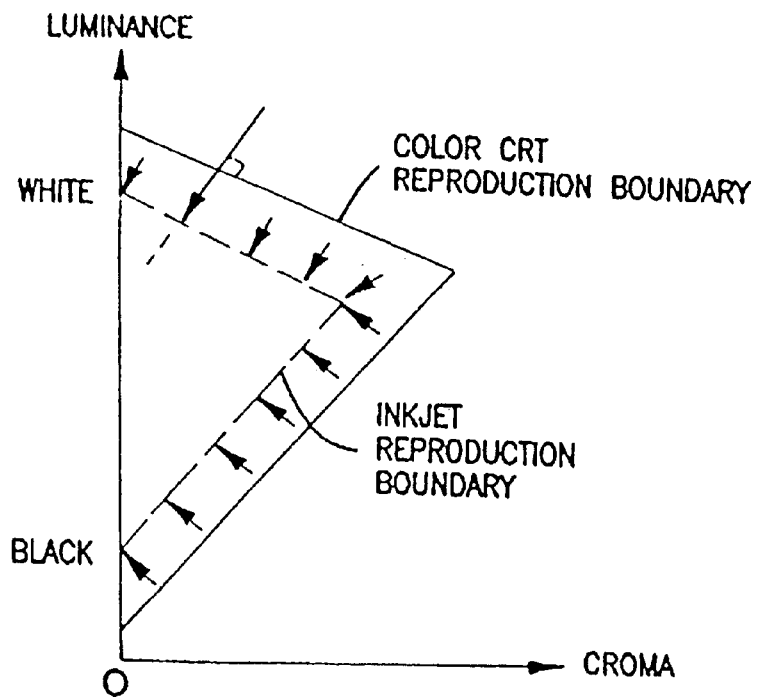
FIG. 9 illustrates a color compression process of a two dimensionally represented gamut of a color CRT onto that of an inkjet printer while a color difference is maintained minimal.

In another example of the controlled adjustment includes a minimal color difference adjustment as shown in FIG. 9. To minimize the color difference, the direction of the adjustments is made substantially perpendicular to the inkjet gamut boundary. The above described mapping techniques are only some examples of the mapping process.

Figure 10:
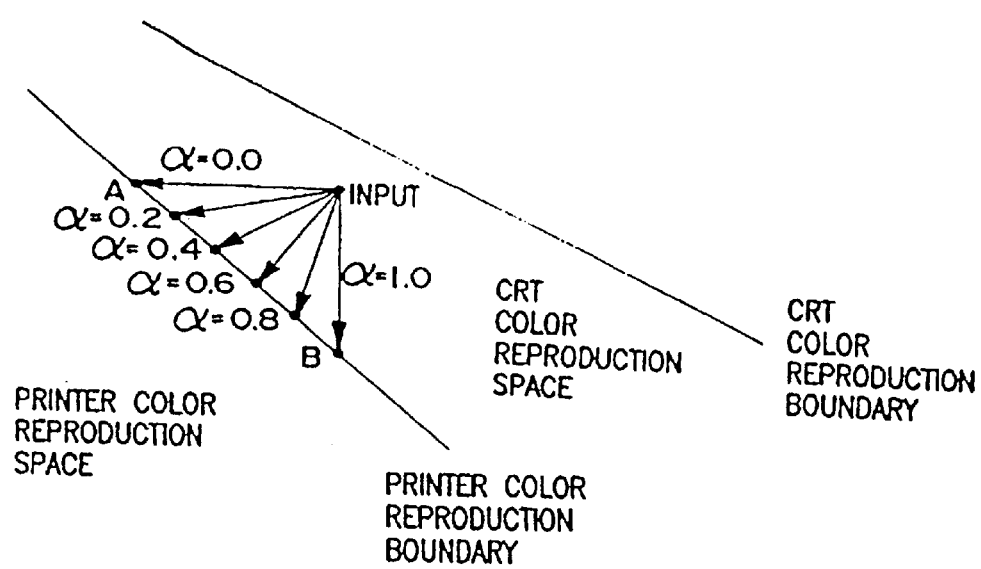
FIG. 10 illustrates a color mapping process of transferring the same input value at different locations in the destination map by varying a parameter value.

Furthermore, the above described mapping techniques are combined to provide additional mapping techniques. For example, referring to FIG. 10, point A in a printer color space boundary is a mapped point of an input point in a CRT color space based upon the minimal color difference mapping technique as described with respect to FIG. 9. Point B is another mapped point on the printer color space boundary for the same input CRT point based upon the minimal croma difference mapping technique as described with respect to FIG. 7. If the line between Points A and B is subdivided into five segments, these subdividing points on the boundary are obtained by adjusting a parameter a in the following equations. Assume that the color space is represented by the LCH model, the input color is defined by $(L_{in}, C_{in}, H_{in})$. Similarly, Point A is defined by $(L_A, C_A, H_{in})$ while Point B is defined by $(L_B, C_B, H_{in})$. When the parameter $\alpha$ is set, the output value is represented by $(L_{out}, C_{out}, H_{out})$ where $L_{out}=(1-\alpha) \times L_A + \alpha \times L_B$; $C_{out}=(1\alpha) \times C_A + \alpha \times C_B$; $H_{out}=H_{in}$. FIG. 10 thus shows that when the parameter $\alpha$ is adjusted by an increment of 0.2, the corresponding output value is also changed in a small increment.

Figure 11:
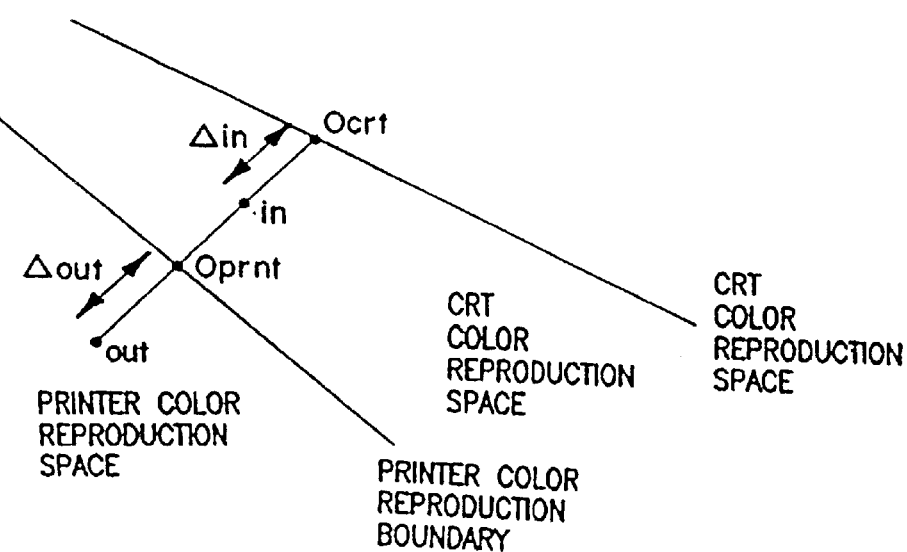
FIG. 11 illustrates a color mapping process of transferring the input value of a first distance with respect to an input map boundary to a destination of a second distance with respect to the output map.

Now referring to FIG. 11, an input color IN is represented as a point in the color CRT reproduction space at a distance $\Delta in$ from the Ocrt point on the color space boundary of the CRT reproduction color space. The input color IN is mapped onto an output color OUT in the printer reproduction color space, and OUT is located at a distance $\Delta out$ from a point Oprnt on the color space boundary of the printer reproduction space. The distances $\Delta in$ and $\Delta out$ are adjusted by a parameter $\beta$ so that the mapping is controlled as follows: $\Delta out=\beta \Delta in$. When $\beta=0$, all of the input colors outside of the output color space are mapped onto the output color space boundary. As the $\beta$ parameter value becomes larger, the output color is generally mapped onto a location away from the boundary. Thus, the $\beta$ parameter value is used to adjust the mapping process.

After the above described predetermined mapping techniques are used to generate the output image data, the evaluation image quality step 200 of FIG. 6 evaluates or extracts a certain image quality index for indicating how well a particular technique has mapped the input data onto the output data. Now referring to FIG. 12, some detailed sub-steps of the step 200 are described according to one preferred embodiment of the current invention. In a step 204, a set of RGB values is inputted. The RGB values are converted into LAB values in a step 206, and subsequently, the LAB values are converted into LCH values in a step 208. The LCH values undergo a mapping step 209 where a particular mapping technique selected in the selection step 100 of FIG. 6 is applied. After the LCH values are mapped, the image characteristics or a certain index is extracted and the index indicates how well the technique mapped the LCH data in a step 210. A step 212 checks if the above described steps are applied to every pixel of the image. If every pixel has not been yet mapped, the above steps are repeated. After every pixel is mapped, in a step 214, the cumulated image characteristic information is evaluated as a whole.

Figure 12:
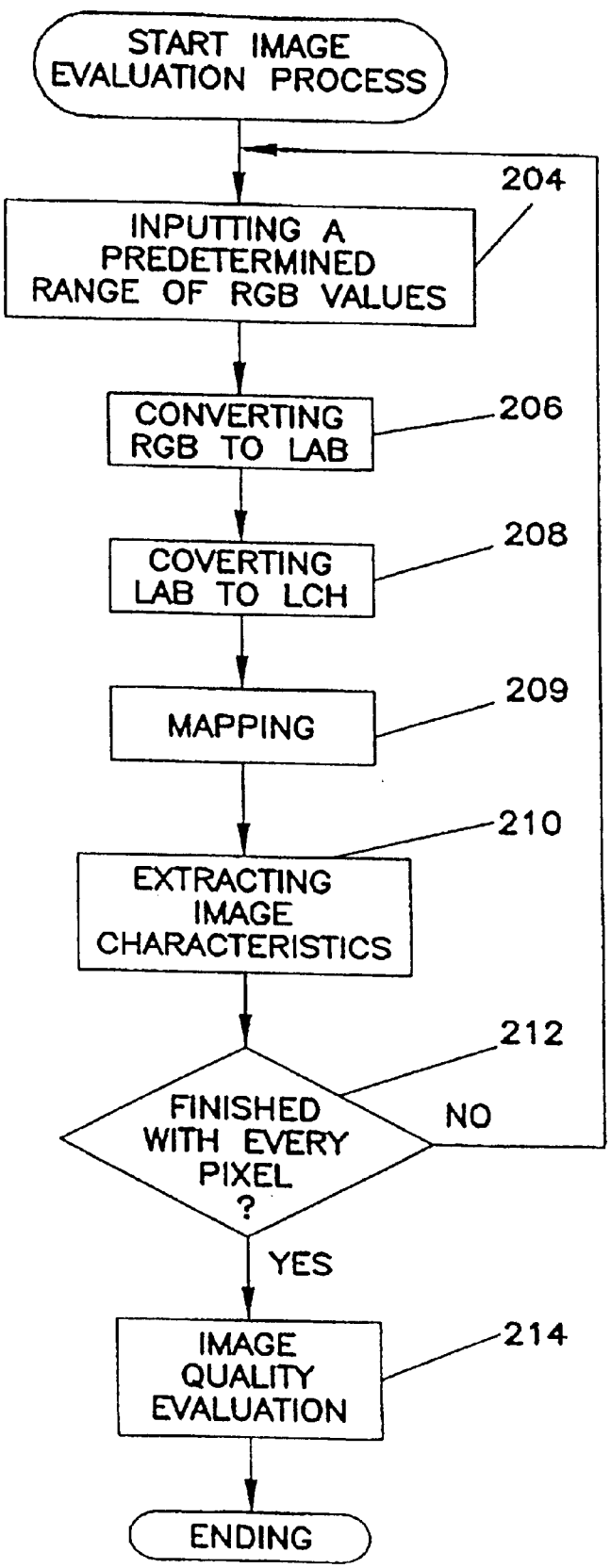
FIG. 12 is a flow chart illustrating one embodiment of evaluating the output image quality according to the current invention.

Still referring to FIG. 12, in the above described image characteristics extracting step 210, some examples of the image characteristic information include a) an average difference between input data and output data and b) a ratio of an output range to an input range. The difference is defined to be $(\Delta L, \Delta C)=(L_{in}-L_{out}, C_{in}-C_{out})$ and $\Delta E=\sqrt{(\Delta L)^2+(\Delta C)^2}$ where $(L_{in}, C_{in}, H_{in})$ is an input pixel data set while $(L_{out}, C_{out}, H_{out})$ is an output and mapped pixel data set. The average values of the above described differences are designated as $AVE_{\Delta E}$, $AVE_{\Delta L}$ and $AVE_{\Delta C}$.

The ratio of an output range to an input range involves $V_{ratio}$, $C_{ratio}$ and $L_{ratio}$ which are respectively a change in color volume distribution, a change in the croma range and a change in the luminance range. $V_{ratio}$ is defined by $V_{out}/V_{in}$ where $V_{in}$ is a number of combinations having different values of $(L_{in}, C_{in}, H_{in})$ in a selected area and $V_{out}$ is a number of combinations having different values of ($L_{out}$, $C_{out}$, $H_{out}$) in the selected area. $C_{ratio}$ is defined by ($C_{MAXout}-C_{MINout}$)/($C_{MAXin}-C_{MINin}$). $L_{ratio}$ is defined by ($L_{MAXout}-L_{MINout}$)/($L_{MAXin}-L_{MINin}$) where $C_{MAXin}$ and $C_{MINin}$ are respectively a maximal value and a minimal value of $C_{in}$ in the selected area. Similarly, $C_{MAXout}$ and $C_{MINout}$ are respectively a maximal value and a minimal value of $C_{out}$ in the selected area. $L_{MAXmin}$ and $L_{MINin}$ are respectively a maximal value and a minimal value of $L_{in}$ in the selected area. Lastly, $L_{MAXout}$ and $L_{MINout}$ are respectively a maximal value and a minimal value of $L_{out}$ in the selected area.

After the above described image characteristic values are determined for each pixel in the image, in the evaluation step 214 of FIG. 12, the cumulated pixel characteristic information is further processed to yield a single evaluation value. The evaluation value for the average difference between input data and output data is defined by $\alpha(AVE_{\Delta E}/MAX_{\Delta E})+\beta(AVE_{\Delta L}/MAX_{\Delta L})+\gamma(AVE_{\Delta C}/MAX_{\Delta C})$ where $\alpha$, $\beta$ and $\gamma$ are coefficients or weights and $MAX_{\Delta E}$, $MAX_{\Delta L}$ and $MAX_{\Delta C}$ are the max value of the change in respective range. A single evaluation value for the ratio of an output range to an input range is defined by $\alpha V_{ratio}+\beta C_{ratio}+\gamma L_{ratio}$ where $\alpha$, $\beta$ and $\gamma$ are weights or coefficients for affecting human perception of colors.

Figure 13:
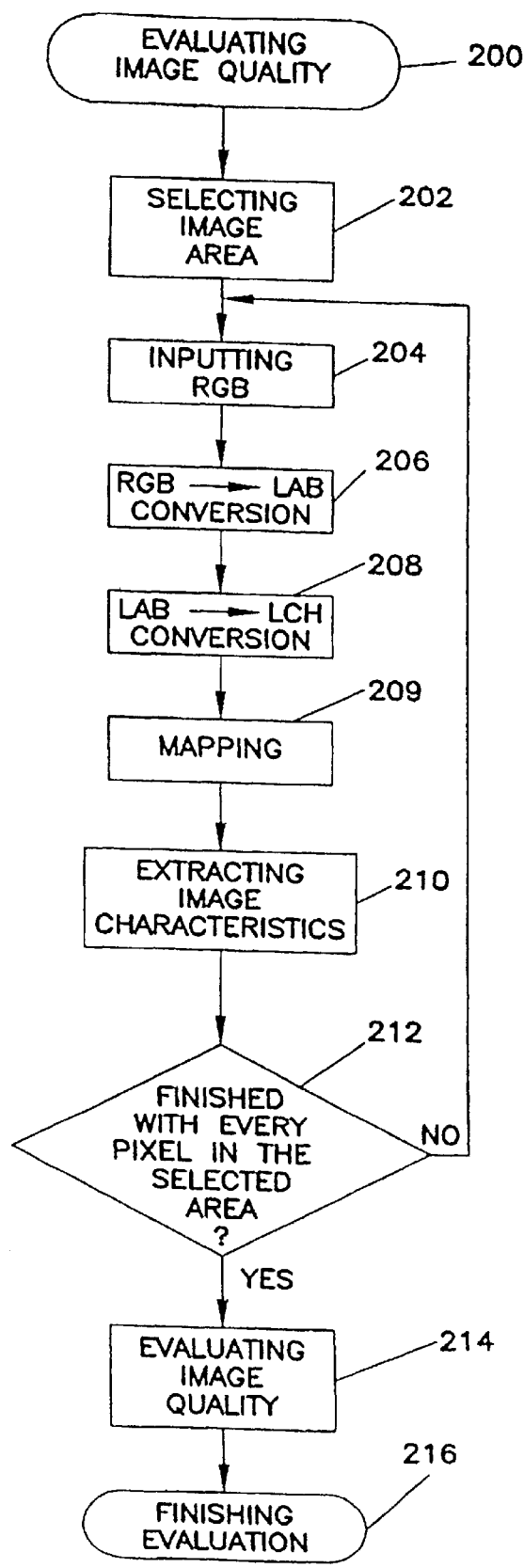
FIG. 13 is a flow chart illustrating another embodiment of evaluating the output image quality of a selected portion of the original input image according to the current invention.

Now referring to FIG. 13, a second preferred image evaluation process according to the current invention is substantially similar to one already described with respect to FIG. 12 except for a step 202. Where a certain portion of the image area is selected based upon the predetermined characteristics, the selection criteria have been discussed with respect to the sample area selection unit of FIG. 4 and are not repeated. The selection step 202 performs substantially the same function as ones already described.

Figure 14:
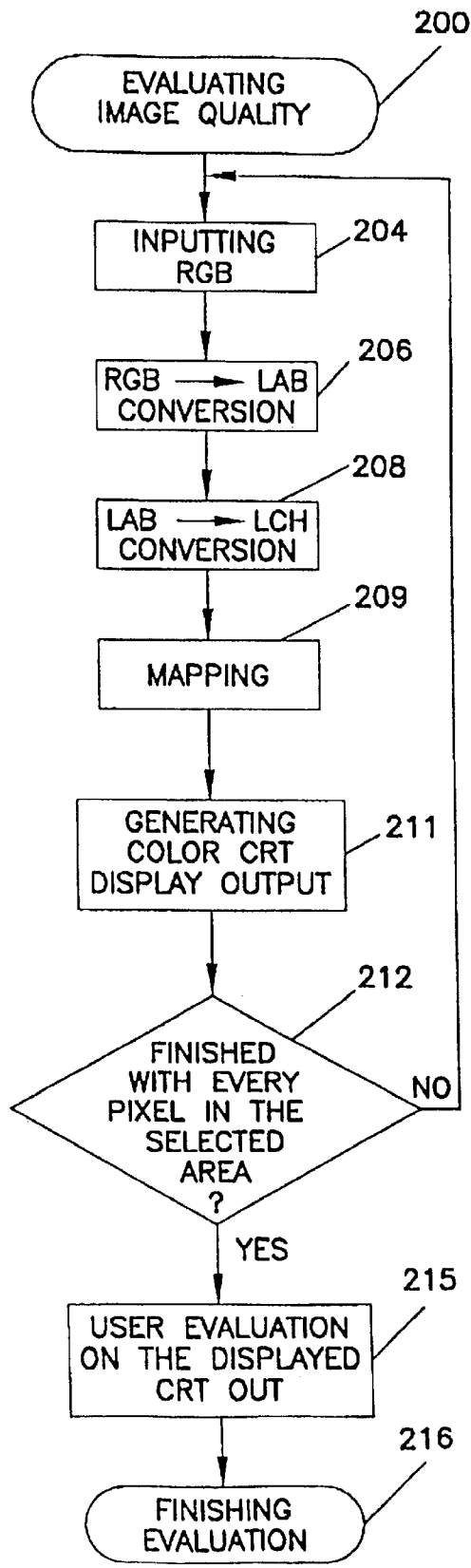
FIG. 14 is a flow chart illustrating yet another embodiment of evaluating the output image quality by an operator according to the current invention.

Referring to FIG. 14, a third preferred image evaluation process according to the current invention is substantially similar to one already described with respect to FIG. 12 except for steps 211 and 215. After the mapping the pixel value, the color display data is generated in a step 211, and the display data corresponds to a mapped color to be displayed on a color CRT display. This display data is generated for the purposes of comparing the mapped color with its original display color on the same color display terminal before actually printing the mapped color on an image-carrying medium. In a step 215, an operator subjectively compares these colors so as to determine which color mapping technique generates an acceptable mapped color that is substantially identical to its original color.

Figure 15:
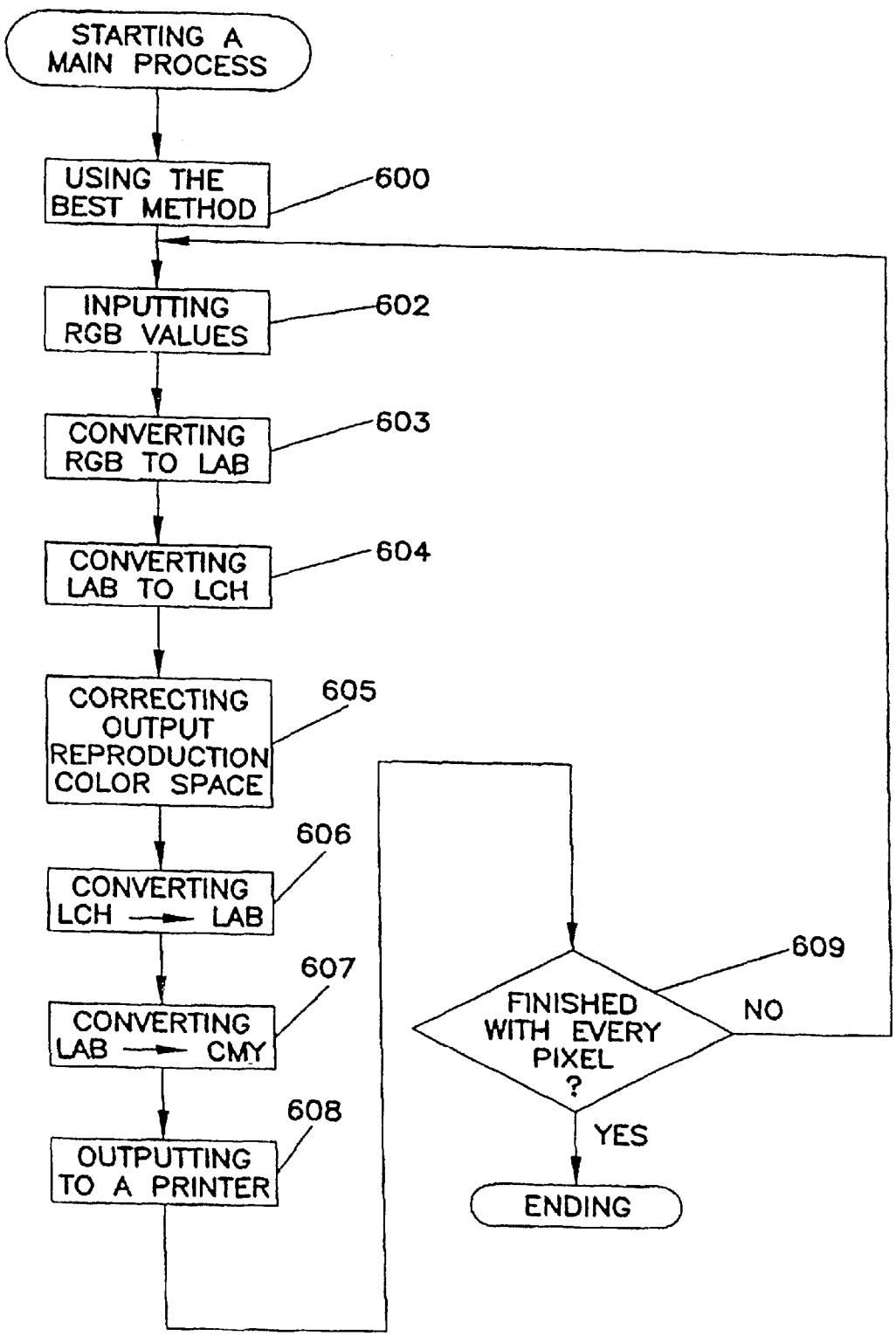
FIG. 15 is a flow chart illustrating a main process of generating an output color image using the image mapping technique selected in the pre-process of FIG. 6 according to the current invention.

Referring to FIG. 15, after the best mapping technique is determined, a main process processes a whole image or other images using the best mapping technique. In a step 600, the best mapping technique is specified, and the RGB values of the image to be converted is inputted in a step 602. In steps 603 and 604, the RGB signal is converted first into Lab and then LCH before correcting or mapping the converted LCH signal into an output reproduction color space in a step 605 using the best mapping technique determined in the pre-processing as shown in FIG. 6. The mapped pixel data in the LCH color space is now converted back to the LAB data in a step 606. In order to print the mapped color on an image-carrying medium, the LAB color data is further converted into the CMY color data in a step 607, and the converted CMY signals which is indicative of the mapped color is outputted to a printer 608. When color data for every pixel undergoes the above described steps in the main process, an image is reproduced on an image-carrying medium such as paper using the best mapping technique.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of color space mapping, comprising the steps of:
   a) storing a plurality of predetermined mapping techniques for converting an input image in a first color space into a second color space of a desired output device;
   b) generating at least a part of an output image in said second color space using each of said predetermined mapping techniques;
   c) comparing said output image generated in said step b) with said input image with respect to each of said predetermined mapping techniques;
   d) determining characteristic values based upon an evaluation of said comparison in said step c) with respect to each of said predetermined mapping techniques; and
   e) selecting one of said predetermined mapping techniques best suited for said input image using said output device based upon said characteristic values in said step d).

2. The method of color space mapping according to claim 1 wherein said predetermined mapping techniques include gamut compressions.

3. The method of color space mapping according to claim 2 wherein said desired output device is a printer.

4. The method of color space mapping according to claim 2 wherein said desired output device is a display monitor.

5. The method of color space mapping according to claim 1 further comprising an additional step of e) generating other output images using said selected mapping technique for said output device.

6. The method of color space mapping according to claim 2 wherein said gamut compression techniques includes a constant compression technique in which a gamut is equally compressed.

7. The method of color space mapping according to claim 2 wherein said gamut compression techniques includes a variable compression technique in which only a part of a gamut is compressed.

8. The method of color space mapping according to claim 2 wherein said gamut compression techniques includes a hybrid compression technique in which a part of a gamut is consistently compressed while another part of the gamut is variably compressed.

9. The method of color space mapping according to claim 2 wherein said gamut compression techniques includes a technique which maintains a purity value during compression.

10. The method of color space mapping according to claim 2 wherein said gamut compression techniques includes a technique which maintains a luminance value during compression.

11. The method of color space mapping according to claim 2 wherein said gamut compression techniques includes a technique which minimizes a color difference during compression.

12. The method of color space mapping according to claim 1 wherein said part in said step b) is selected by an operator.

13. The method of color space mapping according to claim 1 wherein said part in said step b) is selected based upon a predetermined characteristics of said output image, said part defining a selected area.

14. The method of color space mapping according to claim 13 wherein said selected area contains colors outside of said second color space.

15. The method of color space mapping according to claim 13 wherein said selected area contains colors of a relatively high luminance value.

16. The method of color space mapping according to claim 13 wherein said selected area contains colors of a relatively high purity value.

17. The method of color space mapping according to claim 13 wherein said selected area contains a color substantially close to a predetermined color.

18. The method of color space mapping according to claim 17 wherein said predetermined color is Red of RGB.

19. The method of color space mapping according to claim 17 wherein said predetermined color is Green of RGB.

20. The method of color space mapping according to claim 17 wherein said predetermined color is Blue of RGB.

21. The method of color space mapping according to claim 1 wherein said selection in said step e) is made based upon a value of a predetermined variable.

22. The method of color space mapping according to claim 21 wherein said predetermined variable includes an average color difference, an average luminance difference and an average purity difference.

23. The method of color space mapping according to claim 21 wherein said predetermined variable includes a difference in color distribution volumes.

24. The method of color space mapping according to claim 21 wherein said variable is defined by a relation $\alpha V_{ratio} + \beta C_{ratio} + \gamma L_{ratio}$ including coefficients $\alpha$, $\beta$ and $\gamma$, where $V_{ratio} = V_{out}/V_{in}$, $V_{in}$ is a number of combinations having different values of ($L_{in}$, $C_{in}$, $H_{in}$) in said selected area, $V_{out}$ is a number of combinations having different values of ($L_{out}$, $C_{out}$, $H_{out}$) in said selected area, $C_{ratio} = (C_{MAXout} - C_{MINout})/(C_{MAXin} - C_{MINin})$, $L_{ratio} = (L_{MAXout} - L_{MINout})/(L_{MAXin} - L_{MINin})$, where $C_{MAXin}$ and $C_{MINin}$ are respectively a maximal value and a minimal value of $C_{in}$ in said selected area, $C_{MAXout}$ and $C_{MINout}$ are respectively a maximal value and a minimal value of $C_{out}$ in said selected area, $L_{MAXin}$ and $L_{MINin}$ are respectively a maximal value and a minimal value of $L_{in}$ in said selected area, $L_{MAXout}$ and $L_{MINout}$ are respectively a maximal value and a minimal value of $L_{out}$ in said selected area.

25. The method of color space mapping according to claim 1 wherein said comparing in said step c) is made by an operator to select said best suited mapping technique.

26. The method of color space mapping according to claim 25 wherein said operator compares said output images on a color display monitor.

27. A method of adaptably mapping one color space to another, comprising the steps of:
   a) selecting a plurality of mapping techniques for converting an input image originally generated in a first color space into a second color space of a desired output device;
   b) generating a part of an output image in said second color space using each of said selected mapping techniques;
   c) extracting a predetermined characteristic value with respect to each of said mapping techniques based upon a comparison between each output image generated in said step b) and said input image, said predetermined characteristic value indicating how closely colors match between said input image and said output image;
   d) comparing said predetermined characteristic values among said mapping techniques;
   e) selecting one of said mapping techniques based upon said comparison in said step d); and
   f) generating an entire output image using said selected mapping technique in said step e) for said output device.

28. A system for color space mapping, comprising:
   a correction support unit for storing a plurality of predetermined mapping techniques for converting an input image in a first color space into a second color space of a desired output device;
   a reproduction trial unit connected to said correction support unit for generating at least a part of an output image in said second color space for each of said predetermined mapping techniques; and
   a correction evaluation unit connected to said reproduction trial unit for selecting one of said predetermined mapping techniques best suited for said output image based upon a comparison of characteristic values which are each determined by comparing said input image and said part of said output image for each of said predetermined mapping techniques.

29. The system for color space mapping according to claim 28 wherein said reproduction trial unit further comprises a gamut compression unit.

30. The system for color space mapping according to claim 29 wherein said gamut compression unit compresses a whole gamut at an equal rate.

31. The system for color space mapping according to claim 29 wherein said gamut compression unit compresses a gamut at an unequal rate.

32. The system for color space mapping according to claim 29 wherein said gamut compression unit compresses a part of a gamut at an equal rate while said compression unit compresses another part of the gamut at an unequal rate.

33. The system for color space mapping according to claim 29 wherein said gamut compression unit maintains a purity value during compression.

34. The system for color space mapping according to claim 29 wherein said gamut compression unit maintains a luminance value during compression.

35. The system for color space mapping according to claim 29 wherein said gamut compression unit minimizes a color difference during compression.

36. The system for color space mapping according to claim 28 wherein said desired output device is a printer.

37. The system for color space mapping according to claim 28 wherein said desired output device is a display monitor.

38. The system for color space mapping according to claim 37 wherein said display monitor displays said output image in said second color space.

39. The system for color space mapping according to claim 28 wherein said reproduction trial unit selects said part based upon a predetermined characteristics of said output image, said part defining a selected area.

40. The system for color space mapping according to claim 39 wherein said selected area contains colors outside of said second color space.

41. The system for color space mapping according to claim 39 wherein said selected area contains colors of a relatively high luminance value.

42. The system for color space mapping according to claim 39 wherein said selected area contains colors of a relatively high purity value.

43. The system for color space mapping according to claim 39 wherein said selected area contains a color substantially close to a predetermined color.

44. The system for color space mapping according to claim 43 wherein said predetermined color is Red of RGB.

45. The system for color space mapping according to claim 43 wherein said predetermined color is Green of RGB.

46. The system for color space mapping according to claim 43 wherein said predetermined color is Blue of RGB.

47. The system for color space mapping according to claim 28 wherein said evaluation unit selects one of said mapping techniques based upon a value of a predetermined variable.

48. The system for color space mapping according to claim 47 wherein said predetermined variable includes an average color difference, an average luminance difference and an average purity difference.

49. The system for color space mapping according to claim 47 wherein said predetermined variable includes a difference in color distribution volumes.

50. The system for color space mapping according to claim 47 wherein said variable is defined by a relation $\alpha V_{ratio} + \beta C_{ratio} + \gamma L_{ratio}$ including coefficients $\alpha$, $\beta$ and $\gamma$, where $V_{ratio} = V_{out}/V_{in}$, $V_{in}$ is a number of combinations having different values of ($L_{in}$, $C_{in}$, $H_{in}$) in said selected area, $V_{out}$ is a number of combinations having different values of ($L_{out}$, $C_{out}$, $H_{out}$) in said selected area, $C_{ratio} = (C_{MAXout} - C_{MINout})/(C_{MAXin} - C_{MINin})$, $L_{ratio} = (L_{MAXout} - L_{MINout})/(L_{MAXin} - L_{MINin})$, where $C_{MAXin}$ and $C_{MINin}$ are respectively a maximal value and a minimal value of $C_{in}$ in said selected area, $C_{MAXout}$ and $C_{MINout}$ are respectively a maximal value and a minimal value of $C_{out}$ in said selected area, $L_{MAXin}$ and $L_{MINin}$ are respectively a maximal value and a minimal value of $L_{in}$ in said selected area, $L_{MAXout}$ and $L_{MINout}$ are respectively a maximal value and a minimal value of $L_{out}$ in said selected area.

51. A system for adaptably mapping one color space to another, comprising:

a mapping technique selection unit for selecting a plurality of mapping techniques for converting an input image originally generated in a first color space into a second color space of a desired output device;

a preprocessing unit connected to said mapping technique selection unit for generating a part of an output image in said second color space using each of said selected mapping techniques;

an output image characteristics extracting unit connected to said preprocessing unit for extracting a predetermined characteristic value with respect to each of said mapping techniques based upon a comparsion between said input image and each of said parts of said output image generated, said predetermined characteristic value indicating how closely colors match between said input image and said output image;

a comparsion unit connected to said output image characteristics extraction unit for comparing said predetermined characteristic values;

a selection unit connected to said comparsion unit for selecting one of said mapping techniques based upon said predetermined characteristic value; and a main processing unit connected to said selection unit and said mapping technique selection unit for generating an entire output image using said selected mapping technique.

* * * * *